United States Patent [19]

Brozovich et al.

[11] Patent Number: 4,457,186

[45] Date of Patent: Jul. 3, 1984

[54] POWER TRANSMISSION DEVICE

[76] Inventors: John C. Brozovich, 1795 W. 4805 South; John P. Brozovich, 4940 S. 2200 West, both of Salt Lake City, Utah 84118

[21] Appl. No.: 398,867

[22] Filed: Jul. 16, 1982

[51] Int. Cl.³ ............................ F16H 3/22; F16H 1/12
[52] U.S. Cl. ....................................... 74/348; 74/416
[58] Field of Search ................ 74/342, 343, 344, 345, 74/346, 348, 349, 341, 400, 416, 665 H, 434, 438, 439; 403/365, 356; 464/117

[56] References Cited

U.S. PATENT DOCUMENTS

| 958,061 | 5/1910 | Adams | 74/344 |
| 1,453,478 | 5/1923 | Osborn | 74/348 |
| 1,471,162 | 10/1923 | Iacobacci | 74/348 |
| 1,642,763 | 9/1927 | Beyer | 74/348 |
| 1,817,819 | 9/1931 | Healey | 74/348 |
| 2,208,148 | 7/1940 | Schafer | 74/348 |
| 2,926,538 | 3/1960 | Schafer | 74/348 X |
| 3,702,571 | 11/1972 | Sainz | 74/341 |

FOREIGN PATENT DOCUMENTS 970290  1/1951  France ........................... 74/342

Primary Examiner—Leslie A. Braun
Assistant Examiner—Bruce F. Wojciechowski
Attorney, Agent, or Firm—Calvin E. Thorpe; Vaughn W. North; M. Wayne Western

[57] ABSTRACT

A transmission device for providing positive geared, constant mesh, variable speed, rotary power transmission. The device includes a power drive shaft with an axially mounted, slidable drive gear. This drive gear is locked in rotational movement by means of an axial guide track fixed to the power drive shaft. A transmission drive shaft is fixed in oblique orientation with respect to the power drive shaft and carries a plurality of reduction gears of decreasing radius. The reduction gears are mounted on the transmission drive shaft on a spherical mounting race which permits the reduction gear to have an axis of rotation oblique to the axis of the transmission drive shaft and parallel with the axis of the power drive shaft. The spherical mounting race includes projections which are housed in elongated recesses within each reduction gear. Such projections lock the reduction gears in rotation with the transmission drive shaft and provide for power transmission from the power drive shaft, through the respective drive gear and reduction gears, and into the transmission drive shaft. This oblique orientation of the transmission drive shaft and mounting structure for reduction gears having parallel rotational axes with the drive shaft permit alignment of each reduction gear at a common edge and along a parallel line with the power drive shaft.

17 Claims, 7 Drawing Figures

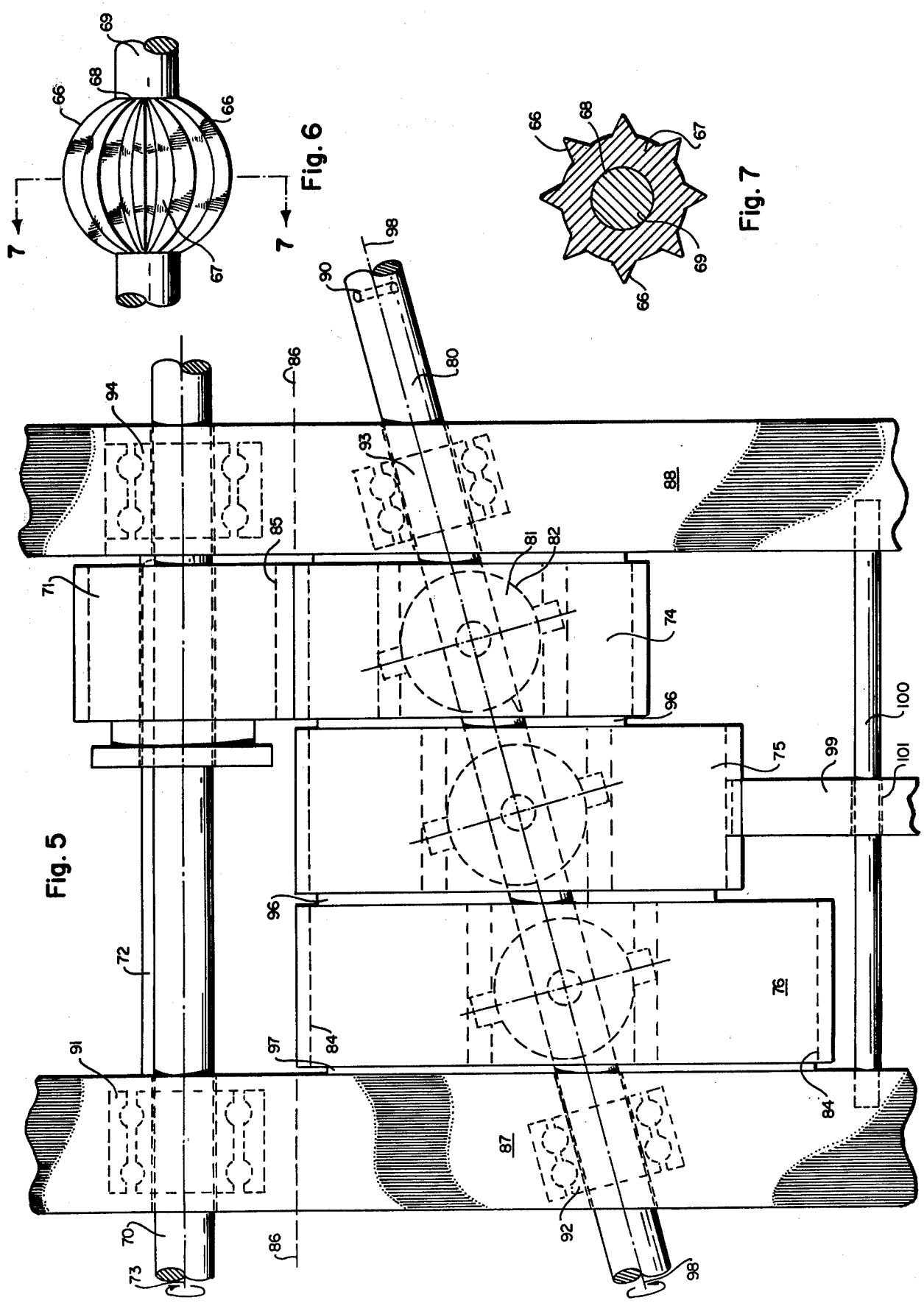

POWER TRANSMISSION DEVICE

BACKGROUND OF THE INVENTION

1. Field of the Art

This invention relates to the field of power transmission devices utilizing meshing gear wheels which vary in size to provide differing ratios of power transmission. More specifically, the subject invention pertains to a transmission system wherein a driving gear is adjusted to contact differing transmission gears for the purpose of transfer of torque from an engine to a load, such as an axle or wheel.

2. Prior Art

Transmission devices for converting torque output of an engine to a variety of rotational speeds and variable driving forces are well-known in the art. In virtually every case, the object of such transmission devices is to transfer the torque developed in a drive gear which turns at the speed of rotation of a motor shaft, to a second shaft which is coupled to a load such as an axle, wheel, rotary bin, or other similar devices requiring torque to drive their movement.

The automobile transmission is perhaps the most common device requiring an adjustment of power from engine output to conform to the needs of a load such as an axle to drive the wheels of a vehicle. In a standard transmission arrangement, a gear box is used with meshing gear wheels for transferring torque output of the engine to the load. As is well-known, the transmission ratio (or gear ratio) is dependent upon the ratio of the numbers of teeth of the meshing gear wheels. These respective gear wheels are typically referred to as the driving gear (which runs at engine speed) and one or more transmission gears, which are housed on a separate shaft, referred to as the lay-shaft or transmission drive shaft. In a typical gear box, the driving shaft and lay-shaft are parallel in orientation and serve as a mount for the respective drive and transmission gears. Because of the differences in size of gears required to develop variable transmission ratios for providing low to high-power gear ratios, such gears must be displaced at various distances along the respective drive and lay-shafts.

This is illustrated, for example, in FIG. 1 which shows a conventional gear box arrangement. In this representation, the respective numerals 10, 11, and 12 represent differing gear ratios utilized to vary the torque applied to the lay or transmission drive shaft 15. For example, it is readily noted that when gears 10a and b are meshed, gear combinations 11 and 12 are not aligned. Likewise, the remaining gears of different size on the drive shaft 14 are in non-alignment with corresponding gears on the transmission drive shaft 15.

With this prior art embodiment, it is clear that multiple drive gears 10a, 11a, and 12a are required to obtain variable transmission ratios for torque transfer to the respective transmission gears 10b, 11b, and 12b. The use of multiple drive gears of different sizes results in complexity of movement control to maintain non-working gears out of mesh while the single working gear pair (i.e., 12a and 12b) are in meshing contact. Furthermore, this arrangement requires a larger gear box in order to house all of the required gears and leads to many difficulties with respect to shifting gears with smooth and even power transmission at variable speeds.

Several transmission devices have developed from the basic gear box concept. In a synchromesh gear box, for example, all drive and transmission gears remain in constant mesh. Various transmission ratios are obtained by means of sleeves which are slid into drive position. In this arrangement, the teeth of the respective drive and transmission gears are helical or spiral in geometrical configuration. This arrangement requires greater complexity and increased expense in order to obtain variable transmission effects. The primary distinction between the synchromesh gear box and the conventional gear box represented by FIG. 1 is that the former gear wheels are brought into mesh by sliding only when the actual gear change is performed. This is in contrast to the constant mesh of the synchromesh system. Based on this distinction, the subject invention relates to conventional gear box systems as opposed to synchromesh concepts.

Other forms of transmission systems exist within the prior art and share the common objective of developing changes in applied torque from the output of an engine or prime mover. To this extent, the transmission of the subject invention is designed to have similar utility. A comparison of mechanical approaches to this objective, however, may well place many of the mechanical transmission systems (such as the synchromesh) outside the actual field of the invention which relates most closely to the conventional gear box shown in FIG. 1.

Based on an overview of transmission systems in general, each state of the art system has one or more of the following problems or defects. The apparatus may be large and bulky in view of multiple gear requirements on the drive shaft and mechanical components necessary to provide control and smooth transition between contacting gears and gear reductions. Many transmission systems do not provide constant gear mesh and therefore increase the difficulty of changing gears without damage, manipulation of engine or vehicle speed, etc. Other transmission devices rely on systems of belt drive to obtain variable power output. Such belt systems require frequent adjustment and have limitations as to speed and power ratings. An additional problem with many conventional transmission devices is the limitation that power input must be on a specific input shaft as opposed to being reversible with the power output side.

OBJECTS AND SUMMARY OF THE INVENTION

It is therefore an object of the subject invention to provide a rotary power transmission device which enables sequential engagement of multiple transmission gears having different gear ratios by a single drive gear mounted on a single drive shaft, wherein the multiple transmission gears are mounted on a single transmission drive shaft or lay-shaft.

It is a further object of the subject invention to provide such a sliding gear engagement system which has positive mesh at all times.

It is yet another object of this invention to provide a gear transmission device which is not limited at high horsepower ratings and which has an extreme range of variable transmission ratios within a compact gear box.

It is a still further object of this invention to provide a geared transmission device which is adapted for power input or output at either side, without limitation.

These and other objects are realized in a rotary power, geared transmission device comprising a power drive shaft adapted at one end for coupling to an external power source and configured to include an axial track guide for an axially sliding gear operable as the drive gear. This drive gear is coaxially mounted on the power drive shaft for sliding movement along its length and includes means for locking the drive gear in axial rotation with the drive shaft. The transmission device further includes a transmission drive shaft having means at one end for coupling to an external load and having a fixed, oblique orientation with respect to the power drive shaft. A plurality of reduction gears are mounted on the drive shaft and oriented to sequentially mesh with the drive gear previously referenced. These reduction gears are mounted on the transmission drive shaft in oblique orientation such that each reduction gear has a rotational axis approximately parallel with the rotational axis of the power drive shaft. Furthermore, at least one edge of each reduction gear is in common alignment with an edge of the remaining reduction gears, such alignment being substantially parallel to the drive shaft, the respective drive shafts and gears each having rotational axes approximately within a common plane.

Each of the referenced reduction gears has a central opening configured to house a gear mounting means which positions the reduction gear in proper orientation on the transmission drive shaft. This central opening enables oblique orientation of the reduction gears during 360 degree rotation with respect to the transmission drive shaft. The central opening includes at least one elongated recess having a direction in substantial alignment with the transmission drive shaft and a configuration which permits movement of a transmission rotational locking device from a forward to rearward position within such recess during 360 degree rotation of the reduction gear. This transmission rotational locking means is fixed to the transmission drive shaft within the central opening of the reduction gear and includes a projecting segment which extends radially into the recess from the transmission drive shaft and operates to rotate the reduction gear in common with the transmission drive shaft while retaining the parallel orientation of the reduction gear with the drive gear, in contrast with the oblique orientation of the transmission drive shaft with the power drive shaft.

Because the reduction gears have a common edge substantially parallel to the power drive shaft, the drive gear is free to slide into sequential engagement without the need of special maneuvering. Furthermore, because all reduction gears are rotating with the transmission drive shaft, rapid changing of gear ratios by sliding the drive gear along the various reduction gears is possible. In fact, in its preferred embodiment, the invention provides a positive geared, constant mesh, variable speed drive capability. Other objects and benefits of the subject invention will be apparent to those skilled in the art based on the following detailed description, taken in combination with the drawings.

DETAILED DESCRIPTION OF THE DRAWINGS

FIG. 5 illustrates a second embodiment of the subject invention, wherein the output ends of the transmission drive shaft are in oblique orientation with respect to the power drive shaft;

FIG. 6 depicts a splined mounting means for reduction gears used in accordance with the subject invention;

FIG. 7 is a cross-section of the splined mounting means of FIG. 6 taken along the plane of 7—7.

DETAILED DESCRIPTION OF THE INVENTION

Figures 1, 2:
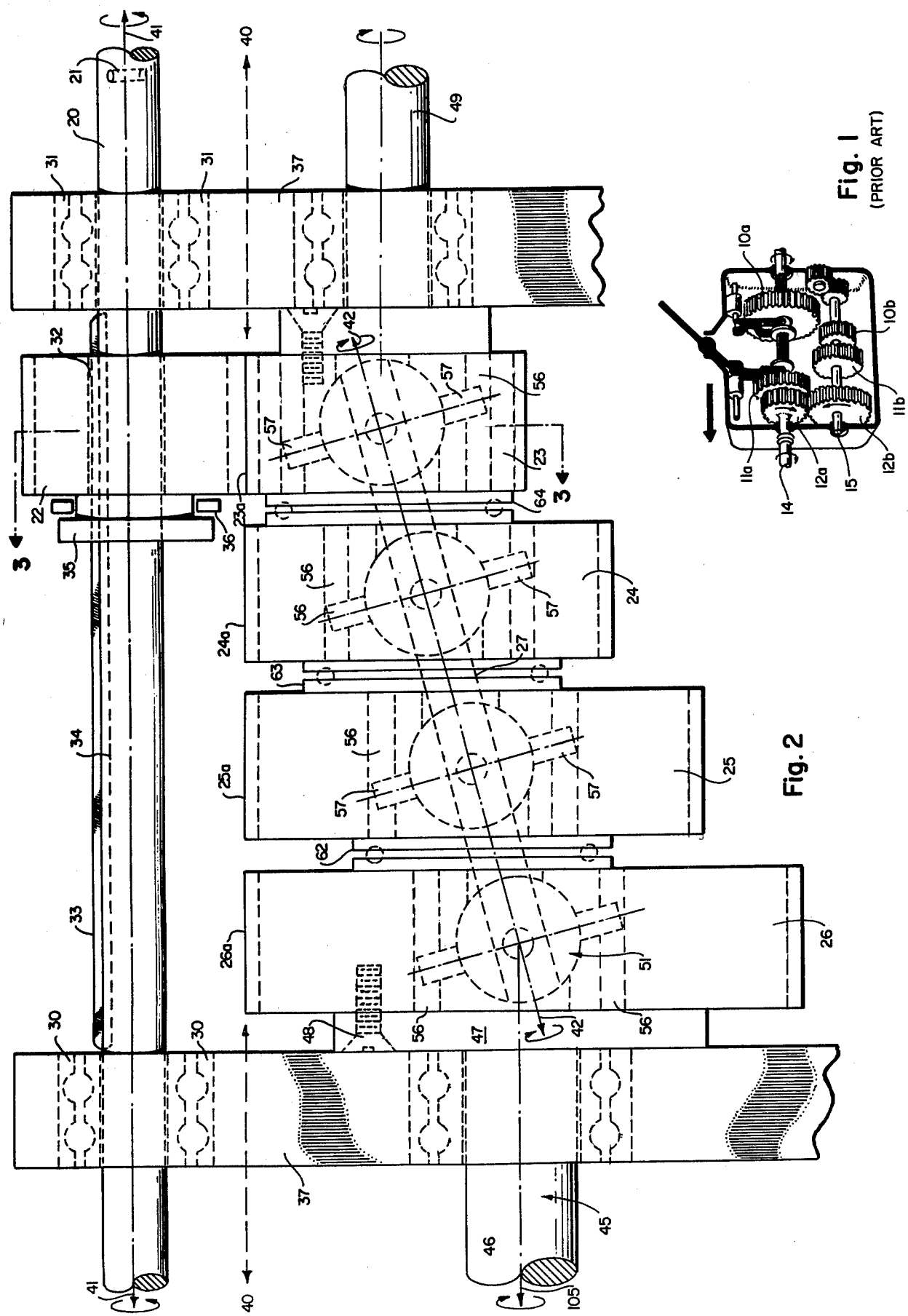
FIG. 1 shows a prior art representation of a conventional gear box with multiple drive gear arrangement.
FIG. 2 is a plan view of the subject invention, with representation of gear teeth deleted to enable clear disclosure of the transmission drive shaft and mechanical assembly within each respective reduction gear.

Referring now to the drawings:

A variable power transmission device in accordance with the subject invention is shown in FIG. 2. This device includes a power drive shaft 20 with means 21 at one end for coupling to an external power source or load. This load may be a crank shaft or an engine or power output shaft of some other prime mover. The drive shaft 20 operates to convey power directly from the engine or prime mover to a drive gear 22 which is coaxially mounted on the power drive shaft 20 and adapted for sliding movement along the longitudinal axis of the drive shaft. In this sense, the power drive shaft 20 provides an axial track guide for reciprocating movement of the axially sliding drive gear 22.

The purpose of providing structure for axial movement along the track guide is to enable engagement of successive reduction gears 23, 24, 25 and 26 which are each mounted on a transmission drive shaft or lay shaft 27.

The power drive shaft 20 and transmission drive shaft 27 are constructed of steel or other rigid materials customarily applied in such transmission devices. Each shaft must be capable of withstanding high speed torque and other stresses. As shown in FIG. 2, the drive shaft 20 is journaled in a pair of clamps 30 and 31. These clamps include friction reduction devices to enhance the efficiency of power transmission from the external power source and to the reduction gears. Numerous devices exist to fulfill this function and are well within the skill of those familiar with this field of art. Therefore, identification of ballbearings or other such devices have not been included in the drawings.

As was previously indicated, a drive gear 22 is mounted coaxially on the drive shaft 20 and reciprocates through various locations in contact with the reduction gears 23, 24, 25 and 26. This drive gear 22 functions to transfer torque from the drive shaft 20 and is therefore configured with a track channel 32 which conforms in geometrical shape to a guide track 33 which is integrally coupled to the drive shaft 20. This guide track 33 operates as a means for locking the sliding drive gear in axial rotation with the drive shaft. Accordingly, as drive shaft 20 rotates, the guide track 33 forces the drive gear 22 to rotate in common therewith. Because the guide track extends along the length of the power drive shaft 20, the drive gear 22 is free to reciprocate or move along any axial direction of the drive shaft while being rotated. Typically, this guide track can be formed by a projecting steel strip which is welded into a slot 34 recessed into the shaft body.

Movement of the guide gear 22 along the drive shaft and track is accomplished by any means 35 which provides a point for application of force in an axial direction with the drive shaft 20. In FIG. 2, a traversing arm 36 seats in a channel formed within the movement means 35. This traversing arm 36 may be coupled to a gear shift lever or control which enables the selective displacement of the drive gear along its axial path.

Orientation of the drive shaft and gear are fixed with respect to the remaining parts of the transmission device by action of the respective clamps 30 and 31 which are fixed in a gear box casing wall 37 or other type of rigid support means which is likewise capable of fixing orientation of the assembly of reduction gears 23, 24, 25 and 26 and transmission shaft 27. This fixed orientation and stable emplacement is required to ensure proper meshing of the respective drive and reduction gears and to generally insure proper cooperation of all parts of the transmission device. Little detail has been provided of this section 37 of the transmission device in view of the various structural forms and housing which can provide the required support.

As is noted in FIG. 2, the subject transmission device utilizes a single drive gear 22, as contrasted in the prior art with multiple drive gears of different sizes. This single drive gear is made possible by maintenance of each of the reduction gears 23, 24, 25 and 26 with an edge 23a, 24a, 25a and 26a in common alignment 40 with the axis 41 of the drive shaft 20. By maintaining this parallel relationship, the drive gear 22 is able to slidably engage any of the reduction gears 23, 24, 25 and 26, provided the number of teeth and configuration are compatible between the respective gears. For example, gears 23, 24, 25 and 26 have 24, 32, 40 and 48 teeth, respectively.

Furthermore, the slidable engagement between the drive gear and respective reduction gears can be of constant mesh to the extent that the drive gear 22 is engaged momentarily into the next gear prior to release from engagement with the prior reduction gear utilized. The configuration of parallel alignment of reduction edges 23a, 24a, 25a and 26a with the line of movement of teeth of the drive gear 22 enables rapid changing of gears by simple mechanical drive mechansims such as the traversing arm 36 illustrated in the figure.

In an automobile transmission, such shift in gears could be accomplished by a computer-driven arm which rapidly displaces the drive gear 22 to a proper reduction gear, based on certain programmed parameters which optimize engine and transmission efficiency. Obviously, the device can also be displaced by manual movement as with a standard transmission. It is clear that the alignment of the reduction gear edges and the drive gear provide numerous advantages beyond those summarized above.

The alignment of reduction gear edges 23a, 24a, 25a and 26a is enabled by use of an oblique transmission drive shaft 27. As appears from FIG. 2, the inclination of the transmission drive shaft 27 will depend upon the rate of gear reduction applied between the first reduction gear 23 and the last reduction gear 26. Reduction gears which are intermediate of the first and last gears may be positioned along the length of the transmission drive shaft 27 at proper locations such that an edge of each intermediate reduction gear is aligned with an edge of the terminal gears 23 and 26. Although FIG. 2 shows these reduction gears at equal spacing along the shaft 27, it will be apparent to those skilled in the art that the interval between gears may be larger or smaller depending upon the gear radius which must extend from the rotational axis 42 of the transmission drive shaft 27 to the edge of the particular reduction gear. For example, reduction gear 24 could be eliminated by use of spacer elements which retain a proper separation between reduction gears 23 and 25, holding each respective gear at its proper location along the transmission drive shaft 27.

Typically, the transmission drive shaft is a substantially straight, rigid, steel shaft or other similar device capable of withstanding the torsional stress and other forces encountered in transmission of power. FIG. 2 discloses means coupled at each end of the transmission drive shaft 27 for coupling to an external load or power source. Since both ends will be rotating at the same rate, in concert with all of the intermediate reduction gears, either end may be utilized for power output, or for power input.

At the left side of FIG. 2 the means for coupling 45 include a shaft 46 which may be directly coupled to a power transmission line for driving a desired load. Rotational power is transferred to this shaft 46 by means of a coupling plate 47 which is integrally attached to the shaft 46 and rigidly coupled to the terminal reduction gear 26. The manner of coupling 42 is by means of a screw 48 which locks the coupling means 45 in tandum rotation with the reduction gears and transmission drive shaft 27. A similar means for coupling the transmission drive shaft output is shown at the right side of FIG. 2 and identified as item 49. It will be apparent to those skilled in the art that both output shafts 45 and 49 can alternatively be utilized as power input shafts for reverse power transmission.

The respective shafts for coupling 45 and 49 are journaled in the support casing 37 so that the relationship between the reduction gears and the drive gear 22 remains fixed. It will be apparent that independent means for supporting the transmission drive shaft and coupling means may be utilized in place of single-member support structure as represented by item 37.

The essential design criteria is that the angle of inclination of the oblique transmission drive shaft 27 with respect to the axis 41 of the power drive shaft 20 be maintained in fixed relationship. Three significant relationships are thereby established. First, the edge of each reduction gear is in common alignment along line 40, which is parallel with the axis of rotation of the drive shaft 20, shown as item 41. In contrast, the axis 42 of the transmission drive shaft 27 is retained in oblique orientation with respect to line 20 and axis 41. Maintenance of these primary three relationships permits use of any number of reduction gears along the transmission drive shaft.

A fourth relationship involves the orientation of the axis of rotation of each respective reduction gear 23, 24, 25 and 26 with respect to the axis 41 of the drive shaft 20. In the preferred embodiment, the respective axis of rotation for the reduction gears will be maintained in parallel relationship with axis 41. This provides for maximum physical contact between the teeth of the drive gear 22 and each respective reduction gear.

With these relationships in mind, it is essential that each reduction gear be mounted on the transmission drive shaft in an oblique orientation, having an angle of inclination substantially equal to the angle of inclination of the transmission drive shaft 27 with the rotational axis 41 of the power drive shaft 20. This axis relationship must be maintained through 360° rotation to insure continuous mesh of the teeth of contacting reduction and drive gears. As a consequence of the parallel relationship of rotational axis of the reduction gears which are mounted on a single transmission drive shaft 27 and the rotational axis 41 of the power drive shaft 20, it is clear that the rotational axes of drive shaft 20, transmission drive shaft 27 and each respective reduction gear shall all lie substantially within a common plain 50 (see FIG. 3).

Figure 3:
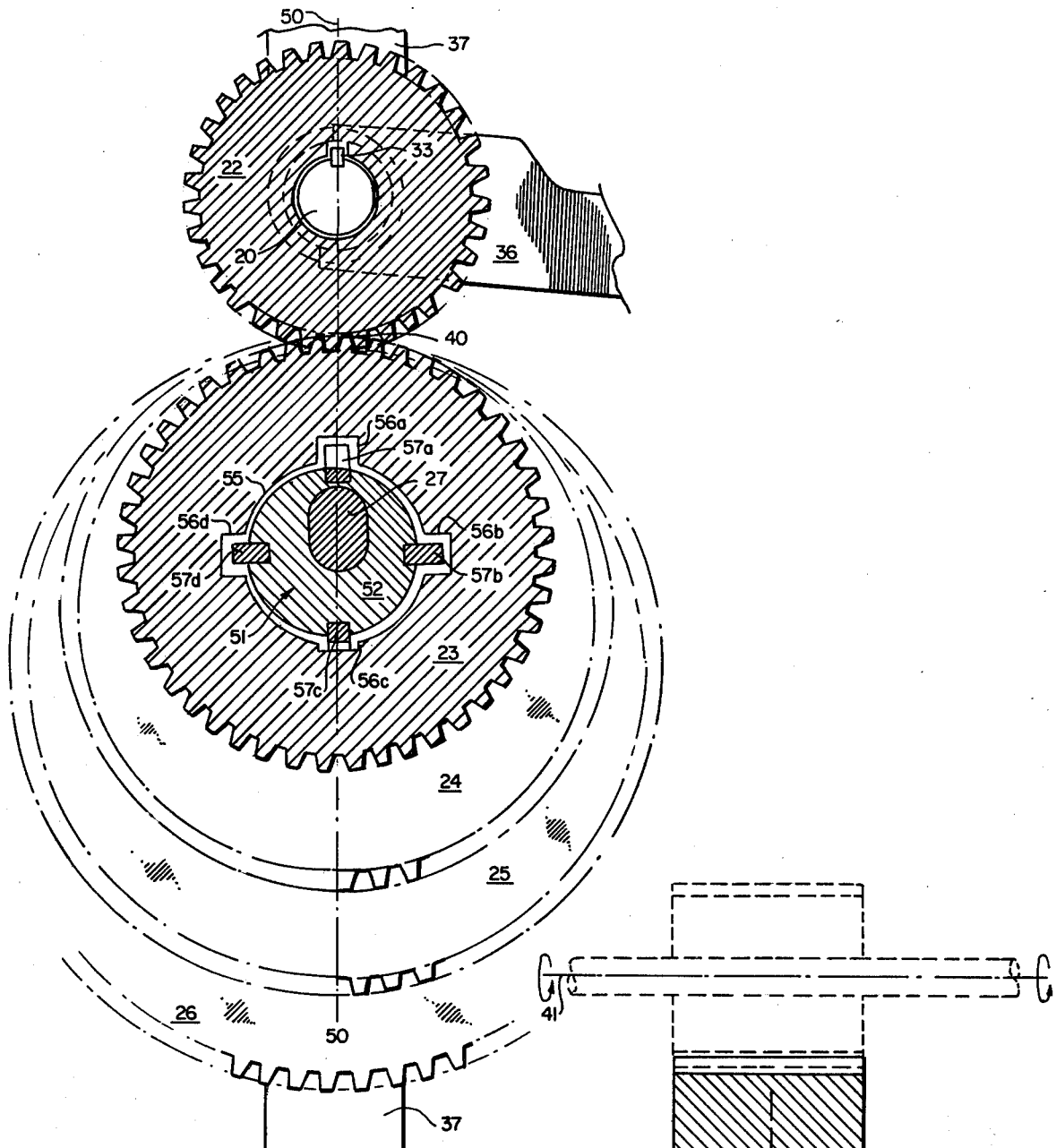
FIG. 3 is a cross-sectional view taken along the lines 3—3.

FIG. 3 further shows the common edge 40 of the respective reduction gears as each gear would mesh with the teeth of the drive gear 22. The aforementioned orientational relationships of the gears and shafts of the subject transmission are enabled in part by the means 51 for mounting the reduction gears on the obliquely positioned transmission drive shaft 27 (see FIG. 3). This mounting means 51 includes an annular spherical surface 52 which is coaxially and immovably fixed with respect to the transmission drive shaft 27. As can be noted from FIGS. 3 and 4, the central opening of this spherical body 52 provides a housing for the transmission drive shaft 27 and provides for coaxial mounting. The depiction of the transmission drive shaft 27 in FIG. 3 appears somewhat elliptical because of the oblique cross-section shown. When viewed along the rotational axis of the transmission drive shaft 42, the combination of the annular spherical body 52 and and shaft 27 would appear as planar, concentric circles.

To form a housing for the mounting means 52, each reduction gear has a central opening 55 configured to house the gear mounting means 52 and to enable the desired oblique mounting of the reduction gear for a full 360° rotation in such configuration. This opening is not illustrated in FIG. 2, however, is shown in the cross-section of FIG. 3, wherein the spherical shape of the opening 55 can be imagined to conform to the spherical shape of the mounting means 52, while having a slightly larger radius to permit movement of the mounting means 52 within opening 55. At the same time, this spherical radius for means 52 is sufficiently small to permit the spherical surface of 52 to rest within the central opening 55 of the reduction gear which is mounted thereon.

Each central opening further includes at least one elongated recess 56 whose elongated direction is in substantial alignment with the transmission drive shaft 27. This recess is configured with sufficient length to permit movement of a transmission rotational locking means 57 which forces the reduction gear to rotate in tandum with the transmission drive shaft 27 and integrally attached mounting means 52.

As shown in the figures, four rotational locking means 57 are depicted; however, other numbers may be utilized. This rotational locking means 57 includes at least one locking segment which projects radially into the recess 56 to transfer rotational motion from the reduction gear to the transmission drive shaft, or vice versa, during the 360° movement. In other words, the locking segments of the rotational locking means 57 engages a side of the elongated recess 56 and results in common rotation of the reduction gears with the transmission drive shaft.

Figure 4:
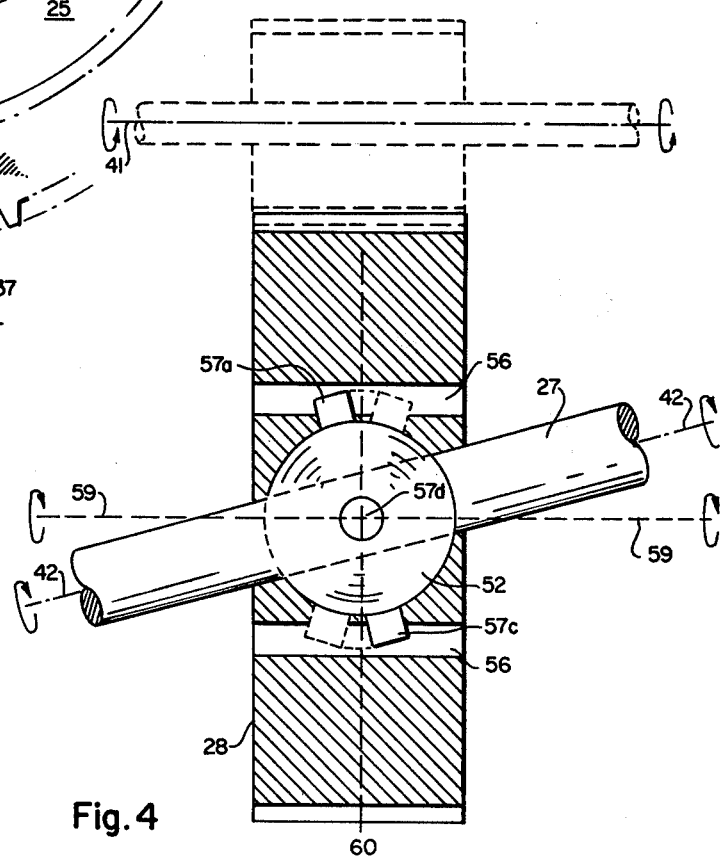
FIG. 4 is a cut-away view of one reduction gear positioned on the transmission drive shaft for providing description of the mounting means of the reduction gear on the transmission drive shaft.

FIG. 4 illustrates the motion of the rotational locking means 57 from alternating forward and rearward positions (shown differentially by the solid lines verses phantom lines of the drawing). Since the axis of rotation 59 of the reduction gear 28 does not have common orientation with the axis 42 of the transmission drive shaft 27, the rotational locking members 57 do not remain on a central position represented by line 60. Instead, segment 57a will be at the left of center line 60 at 0° rotation. Upon completion of 90° rotation, 57a will be at the center line, on the opposite side of spherical means 52 from segment 57d. At 180° of rotation, segment 57a has shifted to a position forward of center line 60 and is in the same position as shown for segment 57c at 0° rotation. Finally, at 270° rotation, segment 57a assumes the position of segment 57d, on the central line 60.

It is therefore clear that during 360° of rotation of the reduction gear 28, each rotational locking means reciprocates from a rearward to forward, and back to rearward position. Nevertheless, constant contact of the rotational locking member against the channel 56 enables continuous transmission of force between the gear and the transmission drive shaft 27. Accordingly, the elongated recess or channel 56 must be configured with sufficient length to permit this movement of the rotational locking means between its forward and rearward positions during rotation. This power transfer configuration enabled by the mounting means 51 (which includes the annular spherical surface 52 and rotational locking means and segment 57) enables fixation of the reduction gears at a rotational axis conforming to that of item 59 in FIG. 4.

The specific parallel orientation with respect to the power drive shaft 20 is maintained by thrust bearings 62, 63 and 64 which maintain force between each reduction gear to maintain its alignment in proper orientation. It will be apparent to those skilled in the art that other means of maintaining this rigid relationship may be utilized. It should be remembered that all gears are rotating in concert, all being locked to the same transmission drive shaft 27.

In the embodiment shown in FIG. 2, the rotational locking means 57 specifically consists of a drive pin which projects from the annular spherical surface into the elongated recess of the central opening 55 of the reduction gear. Other forms of locking means 57 can be envisioned and are intended to be comprehended within the scope of this disclosure. The drive pins 57 are one effective mechanical method of receiving the rotational force conveyed to the reduction gear from the drive gear 22. Although the figures show four drive pins 57a, b, c and d, it should be noted that any number of drive pins may be utilized, depending upon the strength requirements and economics of manufacture.

FIG. 3 shows the cross-section of the transmission device taken along the lines of 3—3 of FIG. 2. This figure demonstrates the offset nature from the center line of item 60 in FIG. 4 for each of the respective drive pins 57a, b, c and d. For example, pin 57a is exposed in its recess 56a and is in the forward position as one views the page of drawings. Drive pin 57b is intercepted by the center line 60 of FIG. 4 and is shown in cross-section, as is drive pin 57d. Pin 57c is partially cut off by the cross-section, with the remaining section viewed being the seated portion of the drive pin within the spherical structure of the mounting means 51. FIGS. 6 and 7 illustrate a second embodiment for the mounting means 51 wherein the rotational locking means comprises spline members 66 which project from an otherwise annular spherical body 67. The central opening of the annulus 68 serves to house the transmission drive shaft 69 tightly within the annular body 67. As with the former mounting means 51, the drive shaft 69 and annular spherical body 67 must be welded or otherwise coupled to turn as an integral unit about the rotational axis of the transmission drive shaft 69.

Where the splined mounting means, as illustrated in FIGS. 6 and 7, is utilized, corresponding modifications must be made to the central opening 55 of each reduction gear and to the configuration of the elongated recesses 56 which receive the respective splined projections from the spherical body. Such modifications would be apparent from the teachings of this application. Therefore, further explanation is unnecessary.

Other modifications of the disclosed embodiments will be apparent to those skilled in the art, based on the description and figures presented herein. For example, FIG. 5 illustrates a transmission drive shaft configuration which projects beyond the lateral support members previously referred to in FIG. 2 as item 37.

The embodiment shown in FIG. 5 includes the power drive shaft 70 and drive gear 71 having a guide track 72 which turn in common about the drive shaft rotational axis 73 in accordance with the description previously applied toward FIG. 2. The drive gear 71 engages one of the three reduction gears 74, 75 or 76 in meshing contact between the respective teeth of each gear. As with the configuration shown in FIG. 2, FIG. 5 does not include representation of the teeth on each respective reduction gear and drive gear for purposes of enabling view of the transmission drive shaft 80 and the respective gear mounting means 81 housed in the central opening 82 of each reduction gear. The presence of teeth on each gear is symbolized by the phantom lines 84 and 85 which appear on the respective reduction gears and power drive gear.

As with the embodiment shown in FIG. 2, the drive shaft axis 73 is in parallel alignment with the respective edges of the reduction gears 74, 75, and 76 along lines 80–86. Likewise, the respective rotational axes of the reduction gears 74, 75 and 76 are in parallel alignment with the drive shaft axis 73.

An additional point of similarity is the use of lateral support members 87 and 88 corresponding to support housings 37 found in FIG. 2. In both FIGS. 2 and 5, these elements 37, 87 and 88 operate as fixed transmission support members for establishing the required oblique orientation of the transmission drive shaft 80 with respect to the power drive shaft 70.

FIG. 5 discloses the transmission drive shaft 80 in full oblique orientation, projecting beyond the fixed transmission support members 87 and 88. Because the transmission drive shaft 80 projects beyond the support members 87 and 88, power input or outtake can be coupled directly to this transmission drive shaft 80. For example, a coupling means 90 has been shown on the right side of the transmission drive shaft 80 for this purpose. It will be apparent that such coupling means can be applied to either end, as with the power drive shaft 70 (or 20 in FIG. 2).

In both embodiments represented by FIG. 2 and FIG. 5, the fixed transmission support members 87 and 88 (item 37 in FIG. 2) operate as means for blocking lateral, axial gear movement beyond the general mounts 91, 92, 93 and 94 within the respective transmission support members. As was the case with FIG. 2, the reduction gears are separated by thrust bearings to ensure proper spatial relationships and functioning. In addition, FIG. 5 discloses the use of additional bearing systems 97 and 98 at the interface of the reduction gears with the respective transmission support members 87 and 88 for purposes of reducing frictional movement upon rotation of the reduction gears against the stationary support members.

Because the transmission drive shaft projects beyond the respective support members 87 and 88 in FIG. 5, the oblique relationship between the longitudinal axis 98 of the transmission drive shaft 80 and the axis 73 of the power drive shaft 70 is most clear. As with the embodiment of FIG. 2, the angle of inclination between these respective axes 73 and 98 will depend upon the gear ratios to be utilized and the spatial distance over which the drive gear and reduction gears operate laterally. This oblique relationship is preserved throughout rotation of the respective gears. Likewise, the operation of the mounting means 81 conforms to the same type of operation as set forth for mounting means 51 in the reduction gears of FIG. 2. A repeated explanation of this operation is deemed unnecessary.

FIG. 5 discloses an additional feature for stabilizing intermediate reduction gears such as gear 75. This is represented by a support gear 99 which is shown in meshing contact with the teeth of gear 75. Support gear 99 is supported on an axle 100 which is mounted in the respective support members 87 and 88. The support gear 99 is mounted on axle 100 by means of a bearing mount 101 which permits free rotation of the support gear 99 in concert with reduction gear 75. Accordingly, any load bearing downward because of shifting weight of the intermediate reduction gears (such as 75) is partially supported by axle 100 in combination with its rotational gear 99. It will be apparent to those skilled in the art that additional support gears following this configuration can be applied where the number of intermediate gears is increased. Such gear supports can also serve as means for reverse transmission output.

In contrast with the single transmission drive shaft 80 of FIG. 5, the drive shaft assembly of FIG. 2 can be viewed as having multiple components. For example, reduction gears 23 and 26 have previously been identified as "terminal" reduction gears. It will be noted that the transmission drive shaft 27 has terminal ends within the central opening of each of these respective reduction gears. At the left side of FIG. 2, item 45 can be viewed as a second transmission drive shaft which is coupled indirectly to the left terminal end of the primary transmission drive shaft 27 through coupling to the reduction gear 26 via screw 48. This second transmission drive shaft 45 is well-adapted for parallel orientation of its axis 105 with the rotational axis 41 of the power drive shaft 20.

Likewise, a third transmission drive shaft (previously referred to as item 49) is coupled to the remaining end of the primary transmission drive shaft 27 and can also be adjusted to a parallel orientation with respect to the power drive shaft 20.

It will be apparent to one skilled in the art that other combinations and variations beyond the two separate embodiments shown by FIG. 2 and FIG. 5 are possible. For example, the second transmission drive shaft 45 can be utilized with the remaining end of the primary transmission drive shaft 27 projecting through the lateral support member 37 (or 88) as shown on the right side of FIG. 5. Also, the opposite arrangement is available wherein the third transmission drive shaft 49 is established in parallel orientation for input or output use, while the remaining end of the primary transmission drive shaft 27 projects through the lateral support member 87, as shown in FIG. 5.

Likewise, other variations and modifications to the subject invention are possible and will be apparent to one skilled in the art. Further variations of the concepts and structural features set forth herein are possible without departing from the scope of the claimed subject matter which follows, and which is to be regarded as the invention.

We claim:

1. A device for providing positive geared, constant mesh, variable speed, rotary power transmission, said device comprising:
   a substantially straight, power drive shaft adapted with means at one end for coupling to an external power source or load and configured to provide an axial track guide for an axially sliding gear;
   a drive gear coaxially mounted on the power drive shaft and adapted for sliding movement along the longitudinal axis of said shaft;
   means for locking said sliding drive gear in axial rotation with the drive shaft;
   a substantially straight transmission drive shaft adapted with means at one end for coupling to an external load or power source and having a fixed, oblique orientation with respect to said power drive shaft;
   a plurality of reduction gears;
   means for mounting said reduction gears substantially parallel to said power driven shaft on said straight driven shaft, each of said reduction gears having a central opening configured to house the gear mounting means and to enable oblique mounting thereof on said transmission drive shaft during 360° of rotation, said opening including at least one elongated recess having a direction in substantial alignment with the transmission drive shaft, said recess being configured with sufficient axial length to permit movement of a transmission rotational locking means from a forward to rearward position within said recess during 360° rotation of said reduction gear; and
   transmission rotational locking means fixed to the transmission drive shaft within the central opening of the reduction gear, said rotational locking means including at least one locking segment projecting radially into the recess from the transmission drive shaft and being configured to transfer rotational motion between the reduction gear and transmission drive shaft during 360° movement.

2. A device as defined in claim 1 wherein the means for mounting the reduction gears on the transmission drive shaft comprises an annular, spherical surface coaxially and immovably fixed with respect to the transmission drive shaft and having a spherical radius sufficiently small to permit the spherical surface to rest within the central opening of a reduction gear mounted thereon, said central opening being at least partially spherically configured to support the reduction gear in the oblique orientation with respect to and during rotation with the transmission drive shaft;
   said device further comprising at least one drive pin projecting from the annular spherical surface into the elongated recess of the central opening of the reduction gear mounted thereon, said drive pin being operable to contact a side of the recess to cause concurrent rotation of the reduction gear with the transmission drive shaft and supporting annular spherical surface.

3. A device as defined in claim 2, further comprising a plurality of drive pins projecting from said annular spherical surface and a plurality of corresponding elongated recesses within the reduction gear opening, each having directions in substantial alignment with the transmission drive shaft and being configured with sufficient length to permit movement of the corresponding drive pins from a forward to rearward position within each recess during 360° rotation of the transmission drive shaft and mounted reduction gear.

4. A device as defined in claim 1 wherein the means for mounting the reduction gears on the transmission drive shaft includes an annular spherical member coaxially and immovably positioned with respect to the transmission drive shaft, said spherical member having a splined surface with each spline element in substantial alignment with the transmission drive shaft;
   said central opening of the reduction gear including corresponding splined recesses adapted to receive the splined surface of the annular spherical member to enable transfer of the rotational movement of the transmission drive shaft to the mounted reduction gear;
   said splined recesses having sufficient length to permit movement of the spline elements from forward to rearward positions during 360° rotation of the mounted reduction gear.

5. A device as defined in claim 1, wherein the transmission drive shaft projects beyond the plurality of reduction gears and is journalled in a fixed transmission support member which operates to maintain the transmission drive shaft in a proper oblique orientation with respect to the power drive shaft while preserving its rotational capability.

6. A device as defined in claim 5, wherein the transmission support member is positioned in the same relative orientation with respect to the transmission drive shaft as are the plurality of reduction gears, said support member providing lateral support to the reduction gears to maintain their oblique orientation with respect to the transmission drive shaft.

7. A device as defined in claim 5, wherein the transmission drive shaft extending beyond the reduction gears includes means for attachment to an external power source or load.

8. A device as defined in claim 7, wherein each reduction gear is spaced from adjacent reduction gears by a thrust washer which is coaxially mounted around the transmission drive shaft.

9. A device as defined in claim 5, wherein the power drive shaft is journalled in the fixed transmission support member, said fixed transmission support member including means for blocking lateral axially sliding movement of the drive gear beyond the journal mount for the power drive shaft within the transmission support member.

10. A device as defined in claim 9, further comprising a second transmission support member having journal means for holding remaining ends of the respective transmission drive shaft and power drive shaft, the relative spacing between said journal means in the second transmission support member being greater than the separation distance between said journal means in the second transmission support member being greater than the separation distance between journal means in the first transmission support member, thereby establishing an oblique orientation between the respective power and transmission drive shafts.

11. A device as defined in claim 10, wherein the respective first and second transmission support members and respective reduction gears and drive gear are in substantial parallel orientation, said support members being positioned against outside faces of the outermost reduction gears, and wherein this parallel relationship of the support members and reduction gears is maintained by the inward force applied toward the reduction gears at the inside face of each support member, said device further comprising means positioned between the respective support members and the outer face of the outer reduction gears to enable rotational movement against said inward force.

12. A device as defined in claim 1 wherein the reduction gears include intermediate reduction gears spaced between terminal reduction gears, said transmission drive shaft having at least one end terminating within the central opening of a terminal reduction gear, said device further comprising a second transmission drive shaft coupled to said terminal end of the first transmission drive shaft, said second transmission drive shaft being positioned in nonparallel relationship with the first transmission drive shaft.

13. A device as defined in claim 12 wherein the remaining end of the first transmission drive shaft terminates within the central opening of the remaining terminal reduction gear, said device further comprising a third transmission drive shaft coupled to the remaining end of the first transmission drive shaft and being positioned in non-parallel orientation with respect to the first transmission drive shaft.

14. A device as defined in claim 12, wherein the second transmission drive shaft is positioned in substantial parallel relationship with the power drive shaft.

15. A device as defined in claim 13, wherein the second and third transmission drive shafts are positioned in substantial parallel relationship with the power drive shaft.

16. A device as defined in claim 12, wherein each reduction gear is separated from adjacent reduction gears by thrust bearings coaxially mounted around the transmission drive shaft.

17. A device as defined in claim 13, wherein the second transmission drive shaft is journalled in a transmission support member which is parallel in relationship with the reduction gears and is further positioned to apply a force normal to the outside face of the reduction gear adjacent to the transmission support member.

* * * * *